(12) United States Patent
Scotson

(10) Patent No.: US 10,666,183 B2
(45) Date of Patent: May 26, 2020

(54) MOTOR CONTROL CIRCUIT

(71) Applicant: TRW Limited, Solihull, West Midlands (GB)

(72) Inventor: Peter Geoffrey Scotson, Worcester (GB)

(73) Assignee: TRW Limited, Solihull, West Midlands ( * ) Notice: Subject to any disclaimer, the term of this patent is extended or adjusted under 35 U.S.C. 154(b) by 141 days.

(21) Appl. No.: 15/843,214

(22) Filed: Dec. 15, 2017

(65) Prior Publication Data

US 2018/0109220 A1 Apr. 19, 2018

Related U.S. Application Data

(63) Continuation of application No. 10/075,124, filed as application No. PCT/GB2014/051730 on Jun. 4, 2014, now Pat. No. 10,075,124.

(30) Foreign Application Priority Data

Jun. 7, 2013 (GB) .................................. 1310193.6

(51) Int. Cl.
*H02P 29/024* (2016.01)
*H02P 21/22* (2016.01)
(Continued)

(52) U.S. Cl.
CPC ........ *H02P 29/0243* (2016.02); *B62D 5/0463* (2013.01); *B62D 5/0484* (2013.01);
(Continued)

(58) Field of Classification Search
CPC .. H02P 29/0243; H02P 21/22; H02P 29/0241; H02P 29/028; H02P 6/28;
(Continued)

(56) References Cited

U.S. PATENT DOCUMENTS 5,568,034 A 10/1996 Huggett et al.
5,677,611 A * 10/1997 Yoshihara ............. B60L 3/0023
318/803
(Continued)

FOREIGN PATENT DOCUMENTS

CN 1934781 A 3/2007
EP 1737116 A1 12/2006

OTHER PUBLICATIONS

Notification of the First Chinese Office Action, Application No. CN201480041579.4 dated May 22, 2017.
(Continued)

*Primary Examiner* — Hunter B Lonsberry
*Assistant Examiner* — Luis A Martinez Borrero
(74) *Attorney, Agent, or Firm* — MacMillian, Sobanski & Todd, LLC

(57) ABSTRACT

A motor control circuit for an electric motor of an electric power assisted steering system comprises a switching circuit comprising a plurality of electrical switches, a current demand signal generator which converts the torque demand signal into a current demands signal; and a fault mode motor current controller that is responsive to an error signal that represents the difference between the current demand signal and the actual current flowing in the motor and is operable in the event of a fault where one phase is open-circuit to drive the remaining two phases as a single combined phase by generating a single voltage demand signal that is representative of the voltage to be applied across the combined phases, the voltage signal being in turn fed into a drive circuit for the switches that generates pulse width modulated switching signals for the switching circuit required to apply the voltage across the combined phases.

9 Claims, 6 Drawing Sheets

(51) Int. Cl.
*B62D 5/04* (2006.01)
*H02P 6/10* (2006.01)
*H02P 27/08* (2006.01)

(52) U.S. Cl.
CPC .............. *B62D 5/0487* (2013.01); *H02P 6/10* (2013.01); *H02P 21/22* (2016.02); *H02P 27/08* (2013.01)

(58) Field of Classification Search
CPC .. B62D 5/0463; B62D 5/0484; B62D 5/0487; B62D 5/046; B62D 5/0478
See application file for complete search history.

(56) References Cited

U.S. PATENT DOCUMENTS

| | | | | |
|---|---|---|---|---|
| 5,963,706 | A * | 10/1999 | Baik | H02P 6/28 318/400.31 |
| 6,424,107 | B1 * | 7/2002 | Lu | H02P 6/10 318/432 |
| 6,448,738 | B1 | 9/2002 | Burton | |
| 7,136,733 | B2 * | 11/2006 | Liu | B62D 5/0487 701/43 |
| 7,202,621 | B2 * | 4/2007 | Tsunoda | B62D 5/049 318/432 |
| 7,279,862 | B1 * | 10/2007 | Welchko | B60L 3/0061 318/563 |
| 7,459,879 | B2 | 12/2008 | Kezobo et al. | |
| 7,528,562 | B2 * | 5/2009 | Kahler | B62D 5/046 318/400.02 |
| 7,545,163 | B2 | 6/2009 | Disser | |
| 7,852,023 | B2 | 12/2010 | Kifuku | |
| 7,923,947 | B2 * | 4/2011 | Rottmerhusen | B62D 5/0481 318/254.1 |
| 8,106,613 | B2 * | 1/2012 | McLean | H02M 7/48 318/400.26 |
| 8,165,757 | B2 | 4/2012 | Jin | |
| 8,502,485 | B2 * | 8/2013 | Kudanowski | B62D 5/046 318/254.1 |
| 8,738,232 | B2 * | 5/2014 | Kanekawa | B62D 5/0481 701/41 |
| 8,884,567 | B2 | 11/2014 | Senkou et al. | |
| 8,941,337 | B2 * | 1/2015 | Uryu | H02P 27/06 318/9 |
| 9,270,213 | B2 * | 2/2016 | Itamoto | H02P 6/12 |
| 9,346,487 | B2 * | 5/2016 | Kimpara | G08B 3/10 |
| 9,421,998 | B2 | 8/2016 | Yoo | |
| 9,594,360 | B2 * | 3/2017 | Park | G05B 15/02 |
| 9,667,181 | B2 * | 5/2017 | Scotson | B62D 5/0487 |
| 9,873,451 | B2 * | 1/2018 | Scotson | H02P 29/0241 |
| 10,075,124 | B2 * | 9/2018 | Scotson | H02P 27/08 |
| 10,141,872 | B2 * | 11/2018 | Cash | H02H 7/0838 |
| 10,541,539 | B1 * | 1/2020 | Miyake | H02J 5/00 |
| 2005/0049770 | A1 * | 3/2005 | Liu | B62D 5/0487 701/43 |
| 2005/0264248 | A1 * | 12/2005 | Tsunoda | B62D 5/049 318/434 |
| 2006/0071628 | A1 | 4/2006 | Ta et al. | |
| 2007/0176577 | A1 | 8/2007 | Kezobo et al. | |
| 2007/0257631 | A1 * | 11/2007 | Rottmerhusen | B62D 5/0481 318/701 |
| 2007/0262744 | A1 * | 11/2007 | Kahler | B62D 5/046 318/807 |
| 2008/0154462 | A1 | 6/2008 | Yamamoto | |
| 2008/0315809 | A1 * | 12/2008 | Tamaizumi | B62D 5/046 318/400.23 |
| 2009/0132126 | A1 | 5/2009 | Tamaizumi | |
| 2009/0251831 | A1 | 10/2009 | Shiba et al. | |
| 2011/0031919 | A1 | 2/2011 | Green | |
| 2011/0068724 | A1 | 3/2011 | Henderson et al. | |
| 2012/0086373 | A1 * | 4/2012 | Kudanowski | B62D 5/046 318/400.22 |
| 2012/0086383 | A1 | 4/2012 | Hernandez Ferrusca et al. | |
| 2012/0256572 | A1 | 10/2012 | Oyori et al. | |
| 2013/0090813 | A1 * | 4/2013 | Kanekawa | B62D 5/0481 701/43 |
| 2013/0138228 | A1 * | 5/2013 | Park | G05B 15/02 700/83 |
| 2013/0221885 | A1 | 8/2013 | Hunter | |
| 2014/0054103 | A1 * | 2/2014 | Kezobo | B62D 5/0487 180/446 |
| 2014/0055059 | A1 * | 2/2014 | Uryu | H02P 27/06 318/9 |
| 2014/0077741 | A1 * | 3/2014 | Kumagai | B62D 5/049 318/490 |
| 2014/0300305 | A1 * | 10/2014 | Itamoto | H02P 6/12 318/474 |
| 2015/0151785 | A1 | 6/2015 | Yoo | |
| 2015/0280502 | A1 * | 10/2015 | Hirotani | H02K 1/2706 310/68 R |
| 2015/0298727 | A1 * | 10/2015 | Kimpara | B62D 5/0463 701/43 |
| 2015/0381085 | A1 * | 12/2015 | Scotson | H02P 29/0241 318/400.04 |
| 2016/0013741 | A1 * | 1/2016 | Prahlad | H02P 23/03 318/503 |
| 2016/0028335 | A1 | 1/2016 | Dixon | |
| 2016/0142003 | A1 * | 5/2016 | Scotson | H02P 29/0243 180/446 |
| 2016/0244089 | A1 * | 8/2016 | Scotson | H02P 29/0241 |
| 2017/0264221 | A1 * | 9/2017 | Cash | H02H 7/0838 |
| 2018/0009469 | A1 * | 1/2018 | March | B62D 5/0463 |
| 2018/0208236 | A1 * | 7/2018 | Asao | B62D 6/08 |

OTHER PUBLICATIONS

Liu et al., "A Strategy for Improving Reliability of Field-Oriented Controlled Induction Motor Drives", IEEE Transactions on Industry Applications, 1993, vol. 29, No. 5, pp. 910-917.
Patent Act 1977: Search Report under Section 17(5), Application No. GB1310193.6, dated Nov. 25, 2013.
PCT International Search Report and the Written Opinion, Application No. PCT/GB2014/051730 filed Jun. 4, 2014, dated Oct. 16, 2014.

* cited by examiner

MOTOR CONTROL CIRCUIT

CROSS-REFERENCE TO RELATED APPLICATIONS

This application is a continuation of U.S. Ser. No. 14/896,457, filed Dec. 7, 2015, the disclosures of which are incorporated herein by reference in entirety, which is a national stage of International Application No. PCT/GB2014/051730, filed Jun. 4, 2014, the disclosures of which are incorporated herein by reference in entirety, and which claimed priority to Great Britain Patent Application No. 1310193.6, filed Jun. 7, 2013, the disclosures of which are incorporated herein by reference in entirety.

BACKGROUND OF THE INVENTION

This invention relates to improvements in motor control circuits for use in electric power assisted steering systems, and in particular to pulse width modulation (PWM) control of multiple phase brushless motors in electric power assisted steering systems.

A motor control circuit for a typical PWM controlled multi-phase electric motor, especially a DC motor, comprises a switching circuit including a set of switches that selectively connect each phase to a voltage source and a controller that modulates the switches to apply PWM voltages to the phases of the motor. The current through the windings or phases of the motor is measured by means of separate current sensors for each of the phases, or by means of a single current sensor that is placed in the circuit so as to measure the total instantaneous current flowing between the D.C. power supply and the switching circuit and motor combination. In a single current sensor system, the multiple motor phase currents are derived by offsetting the PWM patterns of the switches which apply the required voltage to each phase, and sampling the current sensor at appropriate points.

The measured currents are typically converted into the d-q frame with reference to the rotor position and then compared with a current demand signal, also in the d-q frame, indicative of the current that is demanded from the motor, to produce an error signal. Where the controller is primarily controlling the torque output from the motor, the demand current is often generated as a function of a torque signal and the known motor properties. For example, where the motor is used in an electric power assisted steering system the torque demand signal is principally a measure of the amount of assistance torque the motor should apply to the steering to help the driver to turn the wheel.

The error signal therefore represents the difference between the current that is demanded and the actual current flowing in the motor. The error signal is fed to a current controller which produces a set of voltage demand signals representative of the voltages to be applied to each phase of the motor that will best drive the error signal towards zero, and so best ensure that the demanded current flows in the motor. The current controller typically converts the d-q error signal into a d-q voltage demand signals which are then converted further into the three phase voltage signals. These three voltage signals are then converted into respective PWM signals for each of the motor phases depending on which PWM strategy is used. The current controller therefore acts to vary the PWM phase voltages in order to try to constantly minimise the magnitude of the error signal thereby ensuring that the motor current is as close as possible to the demanded current.

In a practical system the current controller will comprise a PI or PID or other type of feedback controller.

Motor drive circuits using feedback control and PWM are well known in the art. For example, WO2006005927, discloses a typical system and the teaching of that document is incorporated herein by reference in entirety.

During steady state operation of the motor, at constant torque and speed, the voltages applied to each of the phases of a three phase motor are typically chosen so that the current in each phase varies sinusoidally over an electrical revolution of the motor rotor, the frequency of the signal therefore being dependent on the speed of rotation of the rotor of the motor, and the magnitude of which is dependent on the required torque. By arranging for each of the current waveforms to be offset from the others by 120 degrees as shown in FIG. 3 the overall current carried by the motor will be constant and so the motor torque will also be constant as the motor rotates. Applying currents in this pattern ensures that the motor rotates smoothly with no peaks in torque. This is well known in the art and the theory behind this will therefore not be described in detail here.

It is also known to provide a fault mode of operation for the motor in the event that one of the phases of the motor fails in an open circuit. When this fault occurs, current can only flow in the two remaining motor phases. If the controller continues in a normal mode of operation to try to apply the waveforms that would be used in normal operation, as shown in FIG. 4, the torque of the motor will vary as the motor rotates because the overall current will vary. In certain applications, such as electric power steering, this variation will be felt through the steering wheel as a torque ripple which may worry a driver. This is shown in Figure

BRIEF SUMMARY OF THE INVENTION

A feature of the present invention is to provide a motor control circuit for a three phase star connected motor that can function in the event that one of the phases is in an open-circuit fault condition.

According to a first aspect the invention provides a motor control circuit for an electric motor of an electric power assisted steering system of the kind in which a measurement of torque carried by a part of the steering system is used to produce a torque demand signal indicative of a torque to be applied to the steering system by the motor, the drive circuit comprising:

- a switching circuit comprising a plurality of electrical switches,
- a current demand signal generator which converts the torque demand signal into a current demands signal;
- a fault mode motor current controller that is responsive to an error signal that represents the difference between the current demand signal and the actual current flowing in the motor and is operable in the event of a fault where one phase is open-circuit to drive the remaining two phases as a single combined phase by generating a single voltage demand signal that is representative of the voltage to be applied across the combined phases, the voltage signal being in turn fed into a drive circuit for the switches that generates pulse width modulated switching signals for the switching circuit required to apply the voltage across the combined phases.

The applicant has appreciated that when a three phase star point connected motor is operated with one open phase the two remaining un-faulted phases act as a single combined phase because at any instant the current flowing into one phase will be equal to the current flowing out of the other un-faulted phase. As such, a novel motor control circuit has been proposed which drives the motor as a single phase when an open-circuit fault occurs requiring only a single voltage demand signal to be produced. The voltage represents the total voltage that is to be applied across the combined phases, i.e. the voltage measured between the ends for the phases that are connected to the switches.

The drive circuit for the switches may be arranged to apply the voltage across the single combined phases so that the polarity of the voltage is reversed each time the motor has rotated through 180 degrees. Thus, the current controller may produce a voltage that has the same value regardless of position of the motor and the PWM drive circuit takes care of the required polarity inversion based on the motor rotor position.

The start and end of the 180 degree rotation may be aligned with the position of the faulted phase. Thus, the start and end will vary depending on which phase has faulted. For a three phase motor, it can be one of three different positions at 0, 120, and 240 degrees.

Switching polarity every 180 degrees ensures that the motor torque is always produced in the same sense for a given motor demand current.

In one preferred arrangement, the switch means may be driven in a first mode to apply the voltage demanded by the controller across the single combined phase by clamping a first end of the combined phase to the positive supply and applying a PWM signal to the second end of the combined phase over one half of an electrical rotation of the motor rotor, and during the other half of the electrical rotation of the rotor the switch means are driven in a second mode by clamping the second end to ground and applying a PWM signal to the first end, the changeover between the two modes corresponding to the position of the failed open circuit phase.

In an arrangement where the switching circuit comprises a bridge with each end of a phase connected to a supply voltage through a top switch and to a ground voltage through a bottom switch, the first end of the combined phase may be clamped to the supply by turning on the top switch during the whole PWM cycle and the bottom switch off, whilst modulating the switches connected to the first end of the combined phase.

The second end of the combined phase may be clamped to the ground by turning on the bottom switch during the whole PWM cycle and the top switch off, whilst modulating the switches connected to the first end of the combined phase.

Alternatively, the voltage may be generated by the fault mode current controller as a function of motor position and may itself vary in polarity as the motor rotates. Thus, the polarity switch is performed during generation of the voltage rather than by the drive stage.

The motor control circuit may generate the error signal fed to the fault mode current controller by comparing the current demand signal with the actual current flowing in any one of the two unfaulted phases. The current demand signal will therefore be indicative of the current that should ideally be flowing through the combined phases.

The current control circuit may also include at least one normal mode current controller which is used during normal operation of the motor when there are no open circuit faulted phases. When there is no fault, the normal mode current controller may be adapted to produce 3 axis voltages for the three phases so that each phase is driven independently.

The current control circuit may switch between the normal mode and fault mode controllers in the event that a phase has faulted as an open circuit. An open circuit fault could, for example, by monitoring the individual phase currents and detecting is one or more of the phases returns a zero or low current measurement when compared with the demanded motor current, i.e. the measurement would have been expected to show a non-zero current.

The motor control circuit may be arranged to supply a different current error signal to the normal mode current controller compared with that fed to the fault mode current controller. The error signal fed to the normal mode current controller may be expressed in the d-q axis frame and may be produced by combining the torque demand signal with a measurement of the position of the motor rotor.

The error signal fed to the normal current controller will therefore comprise a vector defined in a frame of reference that is fixed relative to the position of the rotor. This may be produced by comparing a d-q axis current demand signal with a d-q axis actual current signal.

The motor control circuit may comprise two normal mode current controllers, one controlling the d-axis component of the current and the other the q-axis component of the current. They may both be disabled in the event of an open circuit fault of a phase.

When an open circuit fault of a phase is detected the motor control circuit may be adapted to open the switches associated with the faulted phase.

Each of the d-axis and q-axis controllers may be arranged to convert the d-q axis error current signal in a frame of reference that is fixed relative to the stator and in turn into the 3 axis frame with a voltage for each phase of the motor. The three phase voltages may be produced into two steps—a first step converting the d-q frame that is fixed relative to the rotor into an alpha-beta frame that varies with rotor position using a park transform or similar, and then converting from the alpha-beta frame using any known transform technique.

The conversion from the d-q frame to the alpha-beta frame may be performed using the following two equations:

Alpha axis voltage demand=$d$ axis voltage demand×COS(motor position)−$q$ axis voltage demand×SIN(motor position)

Beta axis voltage demand=$d$ axis voltage demand×SIN(motor position)+$q$ axis voltage demand×SIN(motor position)

The normal mode current controller may convert the output of the PI controller which is a voltage in the dq frame into three voltages for the phases using the following equations:

Phase $U$ voltage demand=Alpha axis voltage demand

Phase $V$ voltage demand=−½×(Alpha axis voltage demand−Beta axis voltage demand×√3)

Phase $W$ voltage demand=−½×(Alpha axis voltage demand−Beta axis voltage demand×√3)

The motor control circuit may therefore be adapted to receive a motor position signal indicative of the position of the rotor. This may be an actual measurement of the rotor position, or an estimate of the rotor position.

The motor control circuit may be arranged so that each of the currents demanded for the two non-faulted phases are waveshaped to reduce the torque ripple as the motor rotates, the shaping comprising varying the magnitude of the current demand signal as a function of motor position. The shaping may comprise producing a current demand signal that varies as a function of the rotor position, using one or more of a linear ramp function, a non-liner ramp function of a cosecant function for a range of motor rotor positions.

Applying waveshaping that is a function of motor rotor position helps to reduce the torque ripple in the motor output.

According to a second aspect the invention provides a motor control circuit for an electric motor of an electric power assisted steering system of the kind in which a measurement of torque carried by a part of the steering system is used to produce a torque demand signal indicative of a torque to be applied to the steering system by the motor, the drive circuit comprising:

- a switching circuit comprising a plurality of electrical switches,
- a motor current controller that generates voltage demand signals to be passed to a drive circuit for the switches that in turn generates pulse width modulated switching signals for the switching circuit that cause the switches to selectively connect the phases to a power supply so as to cause current to flow through the phases of the motor,
- in which the current controller is responsive to a d-q axis error signal that represents the difference between the value of a d-q axis current demand signal that is derived from the torque demand signal and the actual d-q axis current flowing in the motor,
- whereby the current controller converts the d-q axis error signal into three phases voltages using a converter which receives as input the error signal and a motor position signal, and in which in a normal mode of operation the motor position signal varies according to the position of the rotor of the motor and in a fault condition when one phase is open circuit the motor position signal is fixed according to the position of the faulted phase.

The invention of the second aspect provides a drive circuit for a motor which negates the need for duplication of controllers as required by the first aspect of the invention yet also provides for effective control of the unfaulted phases as a single combined phase when an open circuit fault has occurred. Looked at one way it can be considered to achieve this by "tricking" the controller into producing the required voltage demand signals by giving it false information about the rotor position in the fault mode.

In the fault mode the motor position signal may be fixed at the angle of the faulted phase such that when the three voltage signals are calculated the voltage of the faulted phase will be zero and the voltages of the two other phases will be equal and opposite.

The current controller may convert the error signal into the three phase voltages using the equations that define a Park transform to first convert from the d-q frame to an alpha-beta frame or to the fixed frame (fault mode). The transform may be defined by the two equations:

Alpha axis voltage demand=$d$ axis voltage demand× COS(motor position)−$q$ axis voltage demand× SIN(motor position signal value)

Beta axis voltage demand=$d$ axis voltage demand× SIN(motor position)+$q$ axis voltage demand× SIN(motor position signal value)

where (motor position signal value) is the position of the rotor when in the normal mode or is fixed at the position of the faulted phase in the fault mode.

The controller may then convert from the alpha-beta frame, or fixed frame, to the three phased voltages using the following equations:

Phase $U$ voltage demand=Alpha axis voltage demand

Phase $V$ voltage demand=−½×(Alpha axis voltage demand−Beta axis voltage demand×√3)

Phase $W$ voltage demand=−½×(Alpha axis voltage demand−Beta axis voltage demand×√3)

The motor control circuit may include two current controllers, one controlling the q-axis current and the other the d-axis current. Both controllers may function in the manner described above.

In the event of a fault where one phase in open circuit, the d-axis controller may be disabled to force the output of the d-axis controller to zero, control of the current then being performed solely by the q-axis controller.

The motor control circuit may be arranged so that each of the currents demanded for the two non-faulted phases are waveshaped to reduce the torque ripple as the motor rotates, the shaping comprising varying the magnitude of the current demand signal as a function of motor position. The shaping may comprise producing a current demand signal that varies as a function of the rotor position, using one or more of a linear ramp function, a non-liner ramp function of a cosecant function for a range of motor rotor positions.

According to a third aspect the invention provides an electric power assisted steering system comprising a steering mechanism that connects a steering wheel to a road wheel, a torque sensor that produces a torque signal indicative of the torque carried by a part of the steering mechanism, an electric motor that is connected to the steering mechanism so that torque produced by the motor is transferred to the steering mechanism, a means for generating a torque demand signal indicative of a torque to be applied to the steering system by the motor that is a function of the torque measured by the torque sensor, and a motor control circuit that is responsive to a signal dependent on the torque demand signal, the motor control circuit being arranged in accordance with the first aspect of the invention or the second aspect of the invention or both the first and second aspects of the invention.

The motor may comprise a three phase brushless DC motor.

Other advantages of this invention will become apparent to those skilled in the art from the following detailed description of the preferred embodiments, when read in light of the accompanying drawings.

DETAILED DESCRIPTION OF THE INVENTION

Figure 7:
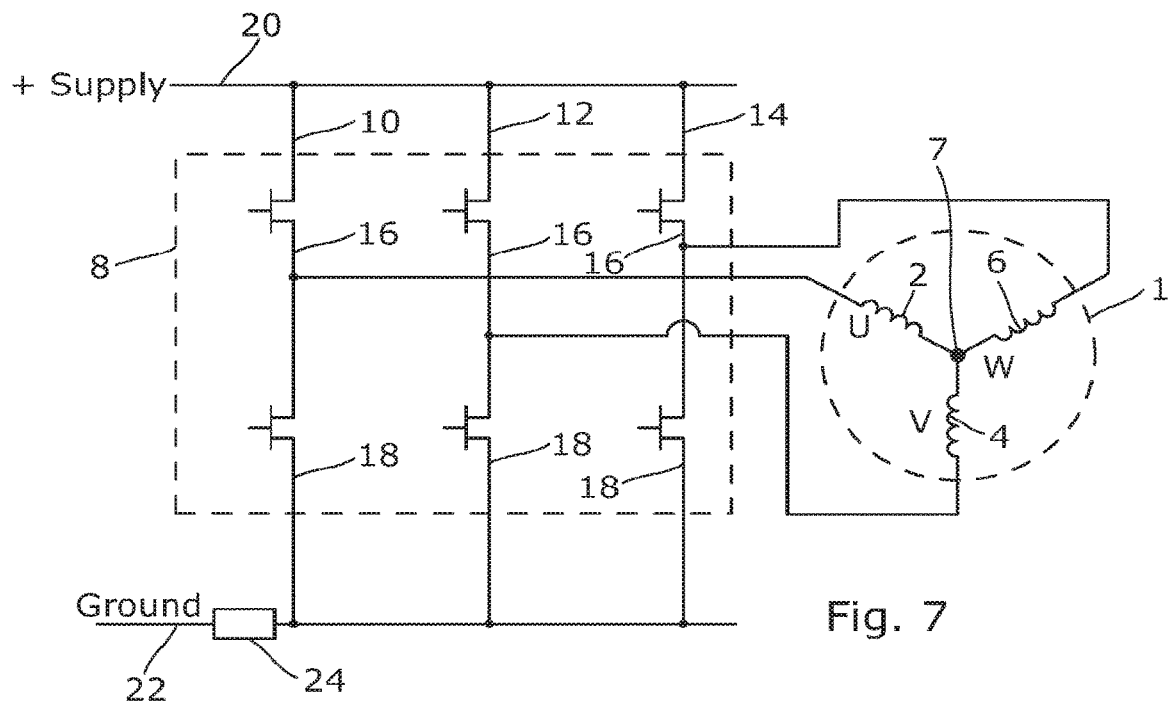
FIG. 7 shows a typical three phase motor switching circuit that is used to modulate the voltages applied to the ends of each phase.

Referring to FIG. 7 a three phase brushless motor 1 comprises three motor windings 2, 4, 6, generally designated as phases U, V and W. The phases are connected in a star network so that one end of each phase is connected to a corresponding end of each of the other phases at the star point. The free ends of each phase are connected to a switching circuit arranged as an H-bridge.

The switching circuit comprises a three phase bridge 8, one for each phase of the motor. Each arm 10, 12, 14 of the bridge comprises a pair of switches in the form of a top switch (transistor 16) and a bottom switch (transistor 18) connected in series between a DC voltage supply rail 20 and a ground line 22. The motor windings 2, 4, 6 are each tapped off from between a respective complementary pair of transistors 16, 18. The switches can be open (OFF) or closed (ON).

Figure 2:
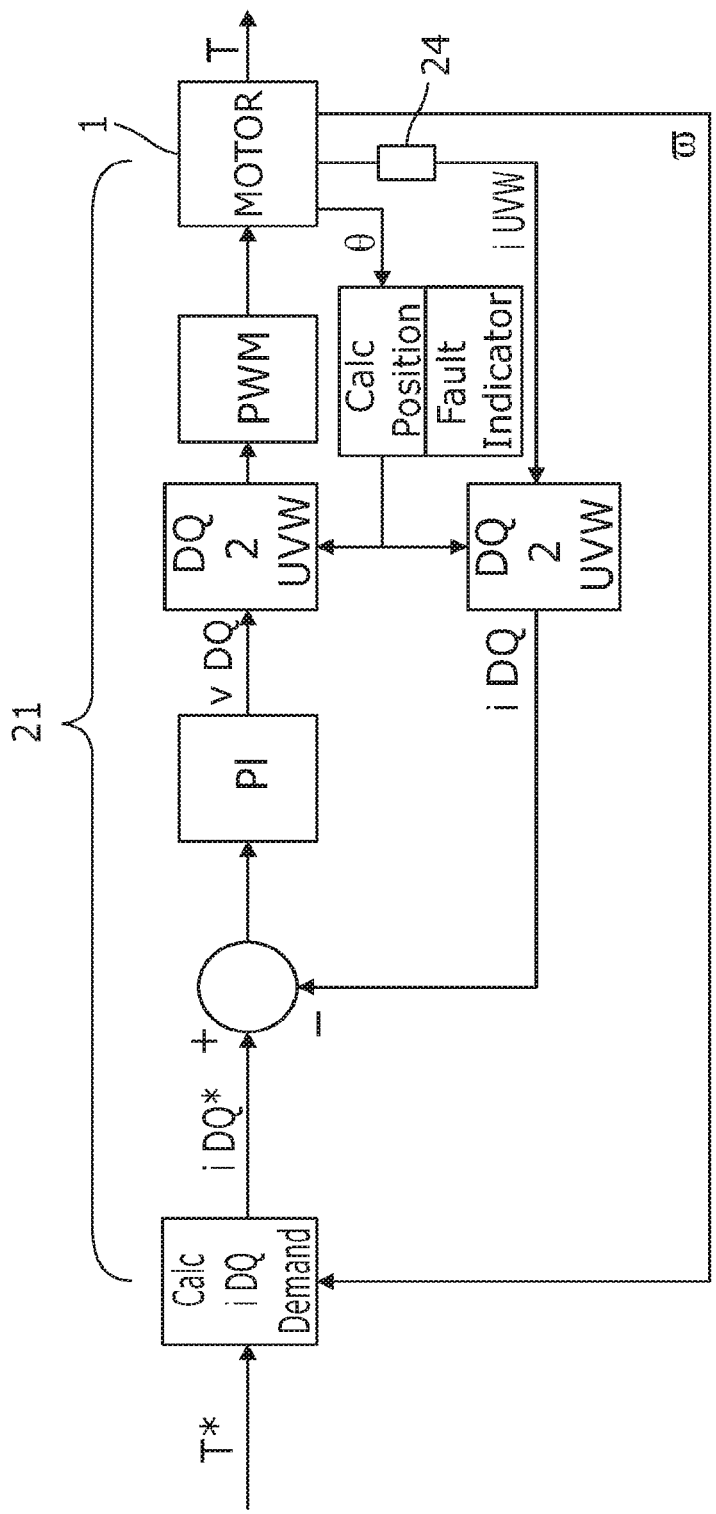
FIG. 2 is a more detailed block diagram showing the elements of the closed loop current controller of FIG. 1.
Figure 3:
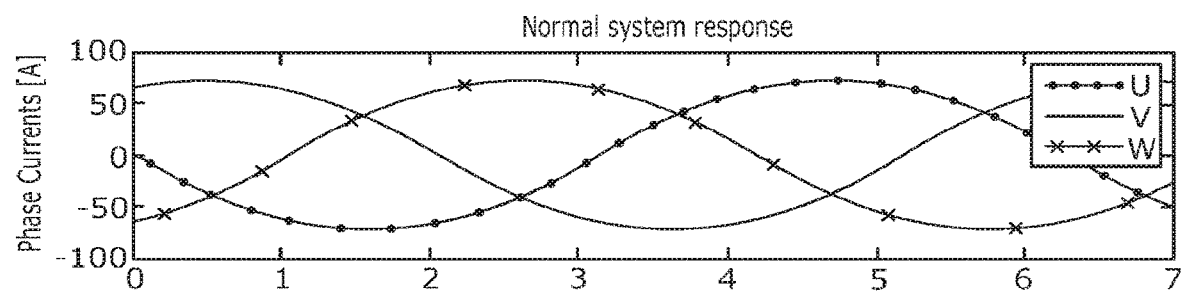
FIG. 3 shows the three phase currents for a working motor which vary sinusoidally to provide a smooth motor toque.
Figure 4:
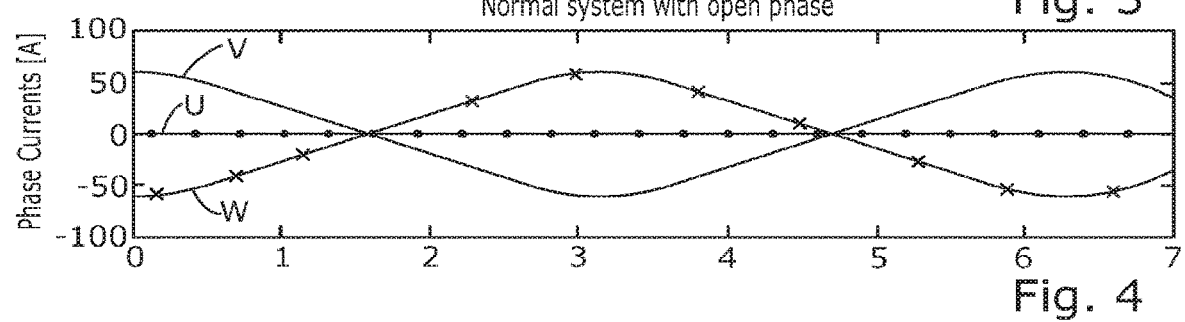
FIG. 4 shows the three phase currents for a motor with a single phase open circuit fault when a fault mode strategy is not used.

The transistors 16, 18 are turned on and off in a controlled manner by a motor controller 21, which is shown in detail in FIG. 2 of the drawings, to provide pulse width modulation of the potential voltages applied to each of the phase windings, thereby to control the potential difference applied across each of the windings 2, 4, 6 and hence also the current flowing through the windings. This in turn controls the strength and orientation of the magnetic field produced by the windings, which sets the torque produced by the motor.

A current measuring device in the form of a resistor 24 is provided in the ground line 22 between the motor 1 and ground so that the controller 21 can measure the total current flowing through all of the windings 2, 4, 6. In order to measure the current in each of the windings the total current has to be sampled at precise instances within the PWM period where the voltage applied to each terminal of the winding (and hence the conduction state of a particular phase) is known. If preferred a separate current sensor could be provided for each phase.

The controller in this example uses a Space Vector Modulation (SVM) algorithm although any modulation technique can equally be used within the scope of the present invention and this should not be construed as limiting.

Each winding 2, 4, 6 in a three phase system can only be connected to either the supply rail 20 or the ground line 22 and there are therefore eight possible states of the switches of the control circuit. Using 1 to represent one of the phases being at positive voltage and 0 to represent a phase connected to ground, state 1 can be represented as [100] indicating phase U at 1, phase V at 0 and phase W at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

During normal operation when the switching circuit is being controlled by the controller 21 to produce pulse width modulation, each of the phases 2, 4, 6 will normally be turned on and off once in each PWM period. The relative lengths of time that are taken up in each state will determine the magnitude and direction of the magnetic field produced in each winding, and hence the magnitude and direction of the total torque applied to the rotor.

Figure 1:
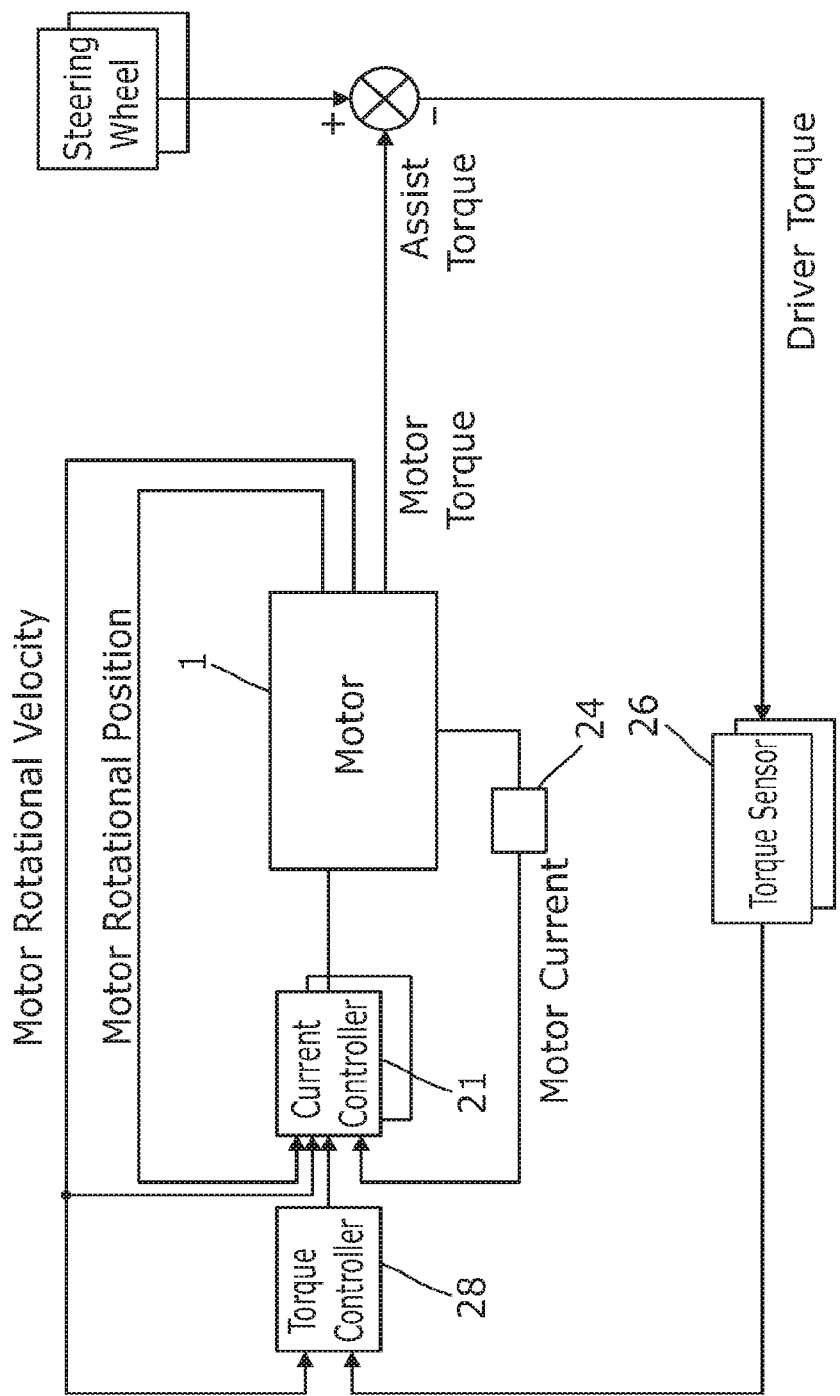
FIG. 1 is a block diagram showing an motor control circuit for an electric motor of an electric power steering system, the motor control circuit comprising an embodiment with the scope of an aspect of the present invention.

The motor control circuit of FIG. 2 can be used in many applications, and in this embodiment forms part of an electric power steering system as shown in FIG. 1. The steering system includes a torque sensor 26 that measures the torque in a steering column, and feeds this to a torque controller. The torque controller takes as an input an assistance torque signal that is indicative of the amount of torque that the motor is to produce and to apply to the steering system to help the driver turn the steering wheel. The value of the assistance torque demand signal is set as a function of the torque applied to the steering system by the driver, hence the need to input the measured torque to the controller.

The torque demand signal is fed into the current controller, which converts the torque demand into a current demand according to known characteristics of the motor. The current demand signal is set as a d-q axis current value, which comprises a vector in a frame of reference that is fixed relative to the motor rotor.

The current controller compares the current demand signal with the actual current flowing in the motor, also in the dq frame of reference, to produce an error signal. The current controller then produces voltages to be applied to each phase that will drive the error to a minimum, thereby ensuring that the actual current matches the demanded current.

The current in the motor causes the motor to generate the demanded assistance torque, and this torque makes it easier for a driver to turn the steering wheel. The system therefore has two closed loops—the torque controller loop which sets the assistance torque, and the current controller loop which drives the current error to zero and so sets the current in the motor.

As shown in FIG. 2, the error signal is produced by subtracting the actual current from the demanded current (although the demanded current could be subtracted from the actual current). This error signal is fed into the PI controller that applies one or more gains to the error to produce a voltage signal in the dq frame of reference.

The d-q frame voltage is then converted into the three voltages needed for the three phases by first converting it into two voltages in the alpha beta frame using a Park transform as follows:

Alpha axis voltage demand=$d$ axis voltage demand×COS(motor position)−$q$ axis voltage demand×SIN(motor position)

Beta axis voltage demand=$d$ axis voltage demand×SIN(motor position)+$q$ axis voltage demand×SIN(motor position)

where the motor position is a value indicative of the position of the rotor or some other position within the motor.

The two voltages are the converted into the three voltages using the following equations:

Phase $U$ voltage demand=Alpha axis voltage demand

Phase $V$ voltage demand=−½×(Alpha axis voltage demand−Beta axis voltage demand×√3)

Phase $W$ voltage demand=−½×(Alpha axis voltage demand−Beta axis voltage demand×√3)

These three voltages are then applied to the respective phases using any known PWM strategy by a PWM converter 38. The controller constantly attempts to drive the error signal to zero, which ensures that the current in the motor phases matches the demanded current.

To apply the Park transform, the current controller block requires a measured or estimated motor position signal as an input parameter. This is provided by the position calculator block shown in FIG. 2.

In normal use, the position calculator outputs a position signal that is representative of the actual position of the motor rotor. This can be derived from the output of a position sensor. Alternatively, in a position sensorless system this may be derived from an estimate of position obtained from observing the currents flowing in the motor.

In a fault mode where one phase is faulted as an open circuit, the calculator block does not output a position signal indicative of the motor rotor position. Instead, it outputs a signal indicative of the position of the faulted open circuit. This may take one of three discrete values, each 120 degrees apart, for a typical three phase motor. The position calculator switches between normal and fault modes in response to an output from a fault indication block (give example of how this block functions).

Figure 5:
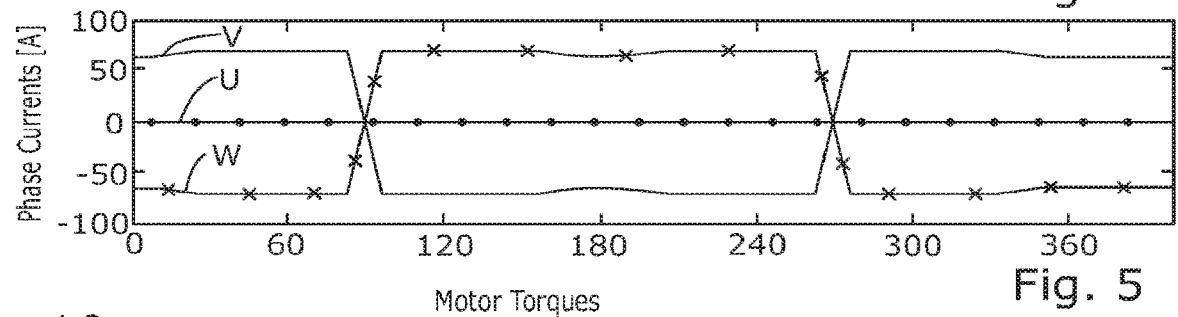
FIG. 5 shows the variation in phase currents applied by the motor control circuit of FIG. 2 when operating in a fault mode.
Figure 6:
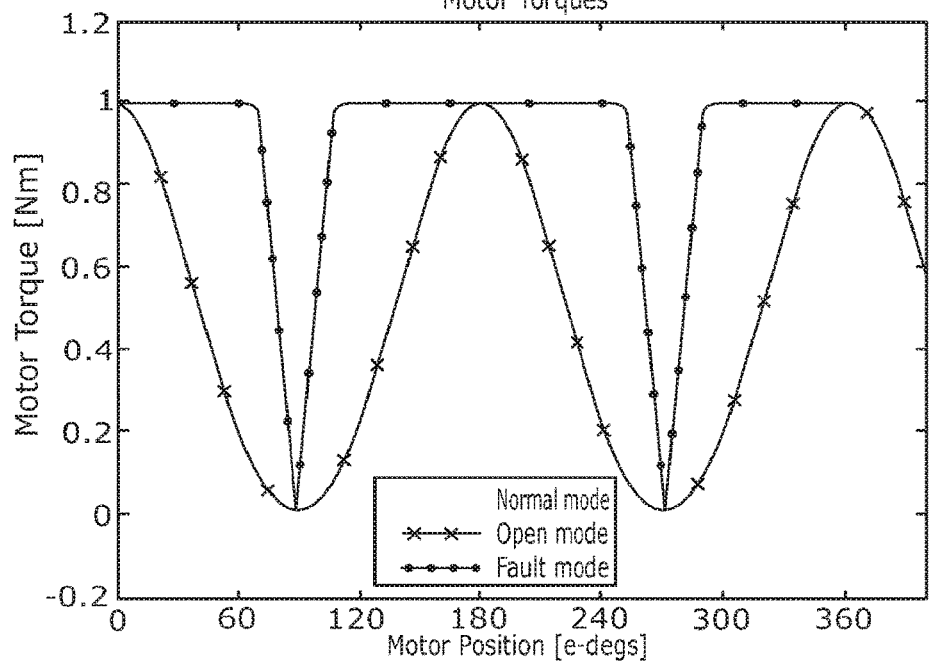
FIG. 6 shows the motor torque corresponding to the current waveforms shown in FIGS. 3, 4 and 5.

By fixing the angle when a fault occurs, the same converter and equations used in the normal mode can be used in order to produce two voltage signals, one for each of the unfaulted phases, as shown in FIG. 5 for the case of phase U being at fault. Because the converter "sees" the rotor as fixed, the voltage will be of a constant value regardless of the position of the rotor and the voltage of the failed phase will be set to zero.

In practice, the circuit of FIG. 2 may include two current controllers that respectively control the q-axis and d-axis currents. When the fault mode is detected the output of the d-axis controller may be set to zero by changing the gains of the d-axis controller. This ensures that only the q-axis controller is used to control the current in the motor, which gives enhanced performance in the fault mode.

The embodiment of FIG. 2 therefore uses as much as possible of the normal current control circuitry to operate the motor in a fault mode. This can be advantageous during design and manufacture as there are minimal changes relative to a system that does not function in the fault mode. Indeed, the only changes needed may be to the block that outputs the motor position signal to the two phases to three phase converter and a block that detects when a fault has occurred.

Figure 8:
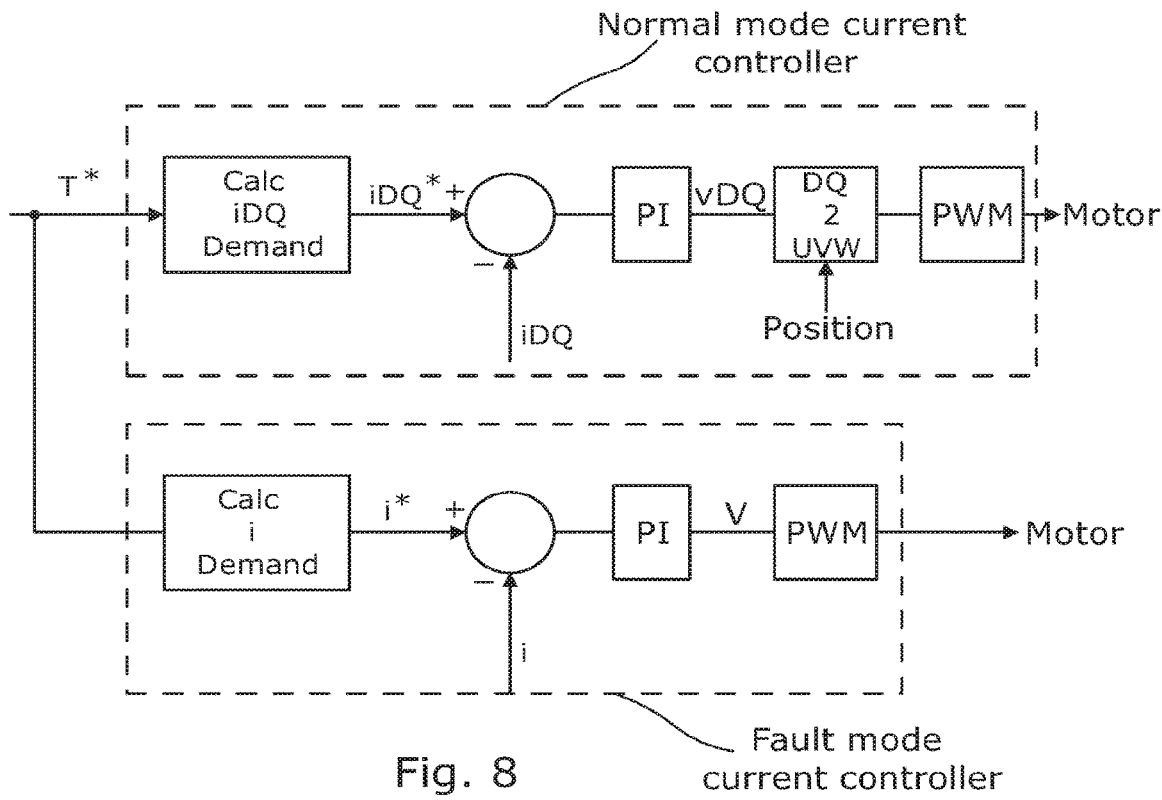
FIG. 8 is a block diagram of an alternative motor control circuit that include a normal mode current controller and a fault mode current controller.

In a modification, shown in FIG. 8, the motor control circuit is provided with a separate current controller for use in the fault mode, the normal current controller used in a non-fault mode being arranged as described above. The circuit may therefore include thee controllers is separate q-axis and d-axis controllers are provided for use in a normal mode. As with the first embodiment, the fault mode is considered to be a mode in which one phase is faulted as an open circuit, the normal mode being when all three phases are unfaulted.

The fault mode controller is simpler than the normal current controller in that it drives the two unfaulted phases as a single combined phase. The applicant has appreciated that in the fault mode the current flowing into one of the unfaulted phases can only be equal to the current flowing out of the other phase. As such the end of one phase can be fixed to the DC supply rail or ground and the other phases PWM modulated, which means that the controller only needs to calculate a single voltage demand signal from the error signal. This single voltage demands signal can then be applied across the combined phases using any known PWM technique.

To determine the single voltage demand signal, the torque demand is first converted into a current demand value that is not in the d-q frame, but is simply a current that is proportion to the torque (or related in some other manner according to the motor characteristics). The controller then compares the current flowing in any of the two unfaulted phases with the current demand signal to produce an error signal, and this is fed into a PI controller with appropriate gains. The output of the PI controller is then converted into a single voltage, or may be used directly as the single voltage. Finally this single voltage is applied across the combined phases using a PWM strategy.

Figure 9:
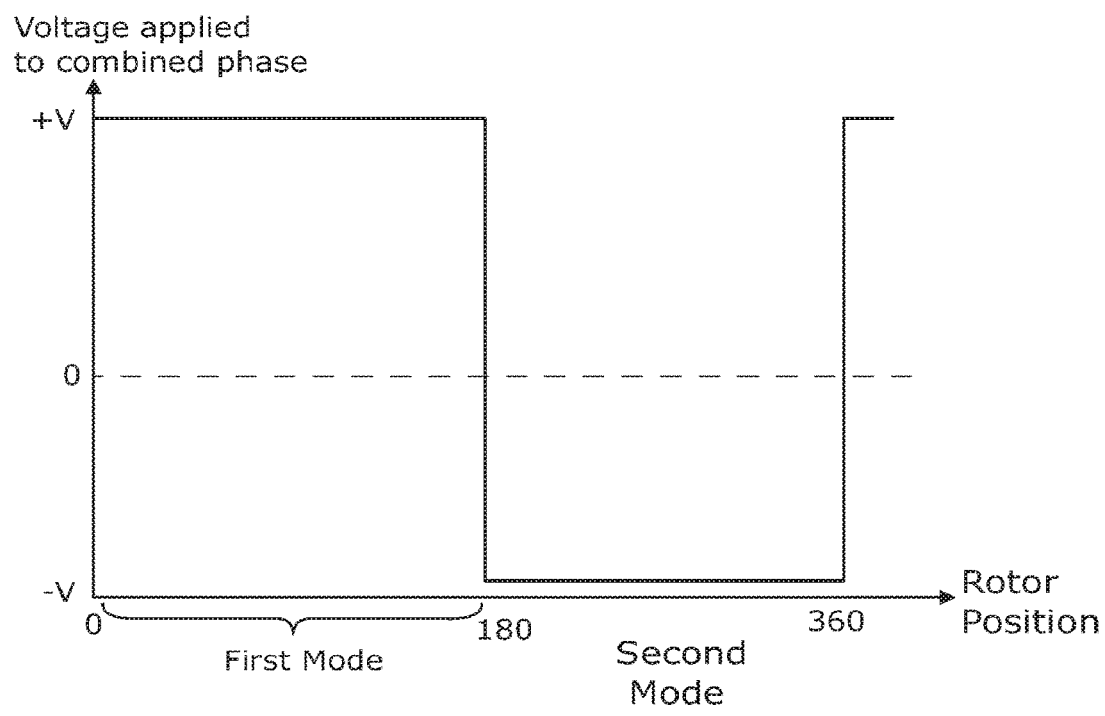
FIG. 9 is a plot of the voltage applied to the combined phases in the fault mode.

In one advantageous PWM strategy, shown in FIG. 9, the voltage applied to the combined phases is switched in polarity each time the rotor has passed through 180 degrees, the changeover corresponding to the position of the faulted phase.

The switch means may be driven in a first mode to apply the voltage demanded by the controller across the single combined phase by clamping a first end of the combined phase to the positive supply and applying a PWM signal to the second end of the combined phase over one half of an electrical rotation of the motor rotor. For example, with the U phase faulted, the V phase may be clamped to the positive supply by closing the top switch and opening the bottom switch and modulating the W phase switches.

During the other half of the electrical rotation of the rotor the switch means are driven in a second mode by clamping the second end to ground and applying a PWM signal to the first end, the changeover between the two modes corresponding to the position of the failed open circuit phase. In the example of the preceding paragraph, this will comprise turning on the bottom switch of the W phase and turning off the top switch of the W phase, then modulating the switches of the V phase.

The PWM modulation is therefore only applied to one phase of the combined phases, but is set to control the overall voltage applied across the combined phases.

Figure 10:
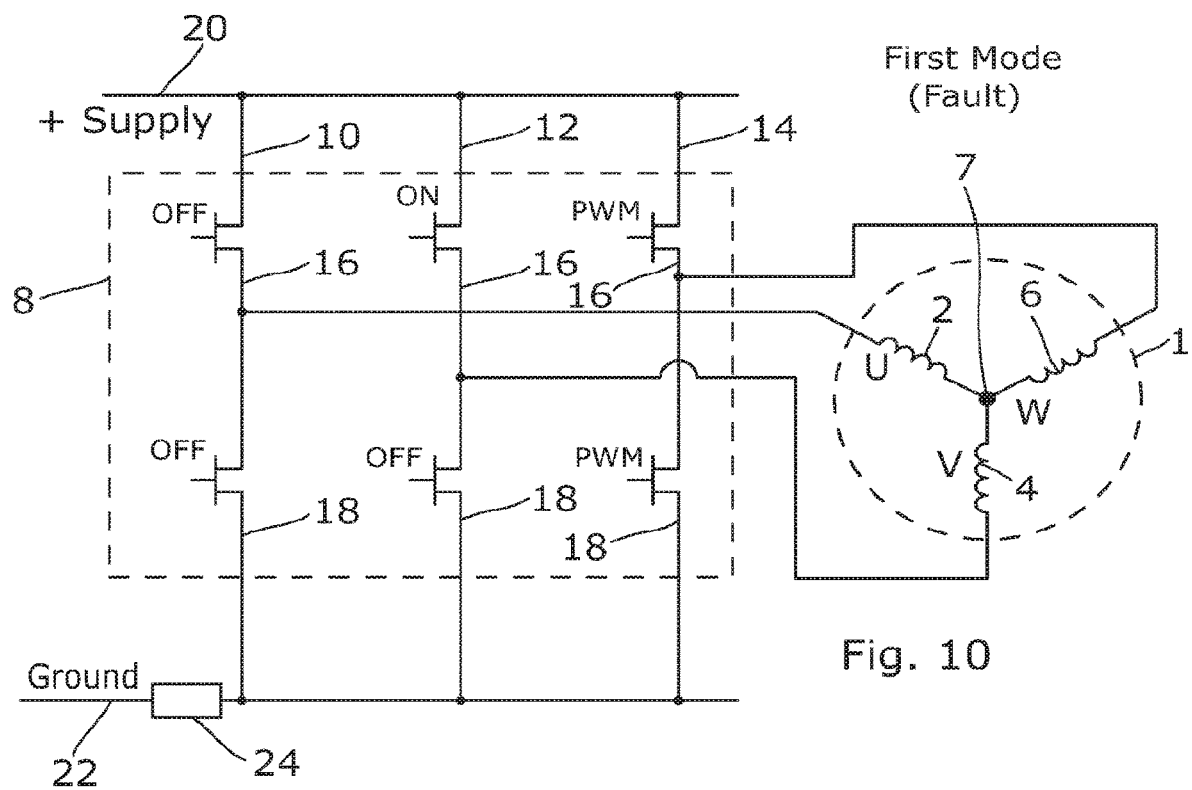
FIG. 10 is a diagram showing the PWM signals applied to the bridge in a first mode of operation when in the fault mode.
Figure 11:
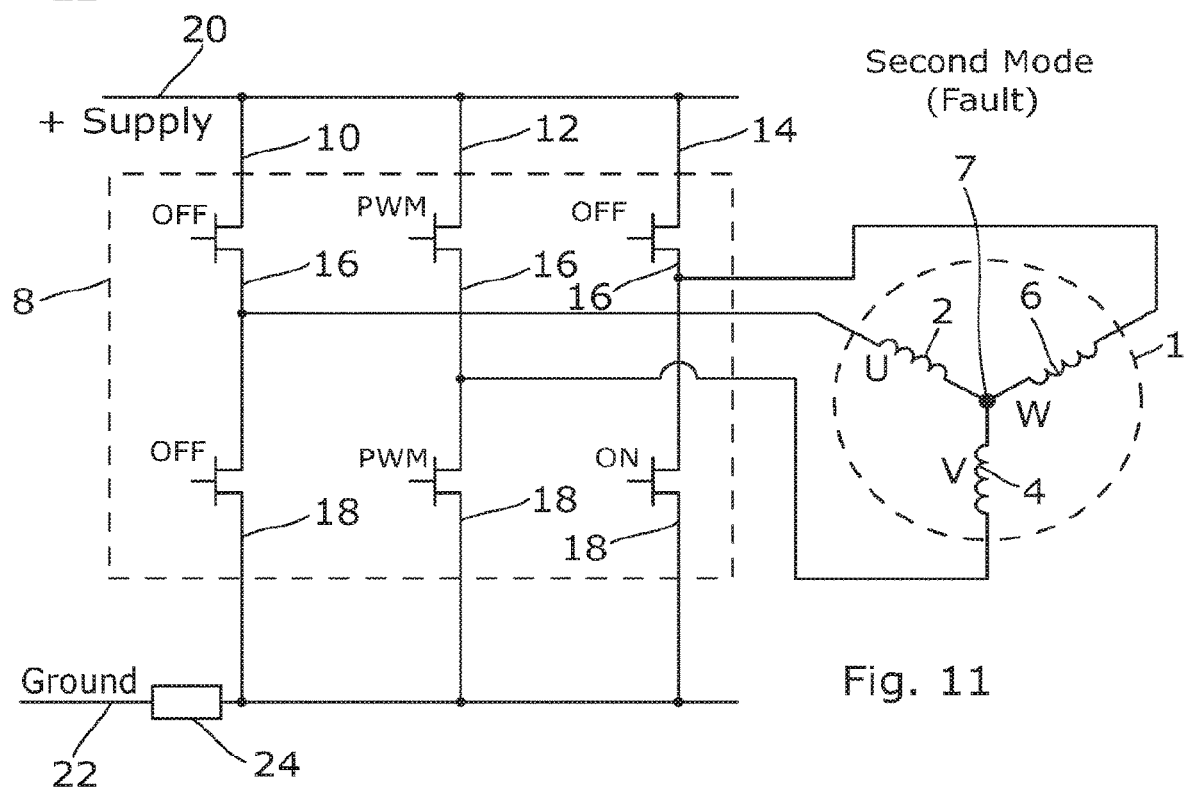
FIG. 11 is a corresponding diagram showing the PWM signals applied to the bridge in a second mode of operation when in the fault mode.

The signals applied to each of the switches of the bridge are shown in FIG. 10 for the first mode and FIG. 11 for the second mode when the U phase is at fault. Note that during the fault mode the switches of the faulted phase are held open (OFF) at all times.

In both embodiments there will still be some ripple present in the motor torque when operating in the fault mode. This is because there are two points in each full rotation of the rotor where the torque generated by the motor will be zero. Also, if the demanded current is held constant the torque will still vary with rotor position.

Figure 12:
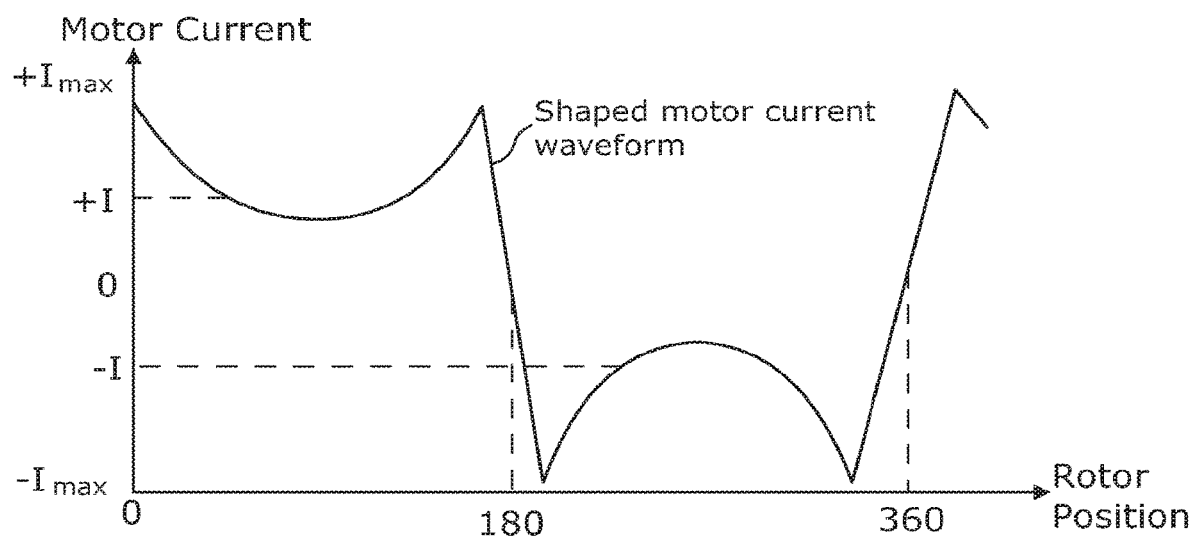
FIG. 12 shows an alternative current waveform that can be applied to the motor phases in the fault mode which has been waveshaped using a combination of a cosecant function and linear ramp of the current demand.

To reduce this, the current demand signal may be waveshaped so that it varies with angular position of the rotor. A suitable waveshape may comprise applying a linear or non-linear ramp gain to the current demands signal as a function of rotor position. For example a non linear function such as a cosine of cosecant curve could be applied. An example of a shaped waveform is shown in FIG. 12. This shaping will, of course, cause the voltages applied to the motor to vary with rotor position in both the normal and fault modes.

Note that the waveform in FIG. 12 varies in polarity every 180 degrees. It could, of course, have the same polarity for all rotor positions with the PWM strategy operating in the two modes described in relation to the first embodiment taking care of the reverse in polarity.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A motor control circuit for an electric motor of an electric power assisted steering system in which a measurement of torque carried by a part of the electric power assisted steering system is used to produce a torque demand signal indicative of a torque to be applied to the electric power assisted steering system by the electric motor, the circuit comprising:
   a switching circuit comprising a plurality of electrical switches;
   a current demand signal generator which converts the torque demand signal into a current demand signal; and
   a fault mode motor current controller that is responsive to an error signal that represents a difference between the current demand signal and an actual current flowing in the electric motor and is operable in the event of a fault where one phase is open-circuit to drive the remaining two phases as a single combined phase by generating a single voltage demand signal that is representative of a voltage to be applied across the combined phases, the voltage demand signal being in turn fed into a drive circuit for the electric switches that generates pulse width modulated switching signals for the switching circuit required to apply the voltage across the combined phases;
   further including at least one normal mode current controller which is used during normal operation of the motor when there are no open circuit faulted phases and in which the current control circuit is adapted to switch between the at least one normal mode current controller and fault mode current controller in the event that a phase has faulted as an open circuit.

2. The motor control circuit according to claim 1 in which the drive circuit for the switches is arranged to apply a voltage across the single combined phases so that a polarity of the voltage is reversed each time the electric motor has rotated through 180 degrees and in which a start and end of the 180 degree rotation is aligned with a position of the faulted phase.

3. The motor control circuit according to claim 1 in which the switching circuit is driven in a first mode to apply the voltage demanded by the controller across the single combined phase by clamping a first end of the combined phase to a positive supply and applying a pulse width modulated signal to a second end of the combined phase over one half of an electrical rotation of the electric motor, and during the other half of an electrical rotation of the electric motor the switching circuit is driven in a second mode by clamping the second end to ground and applying a pulse width modulated signal to the first end, a changeover between the two modes corresponding to a position of the failed open circuit phase.

4. The motor control circuit according to claim 3 where the switching circuit comprises a bridge with each end of a phase connected to a supply voltage through a top switch and to a ground voltage through a bottom switch, and in which the first end of the combined phase is clamped to the supply voltage by turning on the top switch during a whole pulse width modulated cycle and the bottom switch off, whilst modulating the electrical switches connected to the first end of the combined phase.

5. The motor control circuit according to claim 4 in which the second end of the combined phase is clamped to the ground by turning on the bottom switch during the whole pulse width modulated cycle and the top switch off, whilst modulating the switches connected to the first end of the combined phase.

6. The motor control circuit according to claim 1 which is arranged to generate the error signal fed to the fault mode motor current controller by comparing the current demand signal with an actual current flowing in any one of the two unfaulted phases.

7. The motor control circuit according to claim 6 which is arranged to supply a different current error signal to the normal mode motor current controller compared with that fed to the fault mode motor current controller, the error signal fed to the normal mode motor current controller comprises a vector defined in a frame of reference that is fixed relative to a position of the electric motor produced by comparing a d-q axis current demand signal with a d-q axis actual current signal.

8. The motor control circuit according to claim 7 which comprises two normal mode current controllers, one controlling a d-axis component of the current and the other a q-axis component of the current and in which both are disabled in the event of an open circuit fault of a phase.

9. The motor control circuit according to claim 1 which is adapted so that each of the currents demanded for two non-faulted phases are waveshaped to reduce a torque ripple as the electric motor rotates, the waveshaping comprising varying a magnitude of the current demand signal as a function of motor position.

* * * * *